United States Patent
Seol et al.

(10) Patent No.: US 7,869,834 B2
(45) Date of Patent: Jan. 11, 2011

(54) MOBILE TERMINAL

(75) Inventors: Won-Seok Seol, Seoul (KR); Min-Soo Kim, Gyeonggi-Do (KR); Byoung-Wook Kim, Seoul (KR); Chang-Yong Jang, Gyeongsangnam-Do (KR); Ho-Myoung Shin, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 564 days.

(21) Appl. No.: 11/924,276

(22) Filed: Oct. 25, 2007

(65) Prior Publication Data

US 2008/0242359 A1 Oct. 2, 2008

(30) Foreign Application Priority Data

Mar. 28, 2007 (KR) ............... 10-2007-0030464
Jun. 5, 2007 (KR) ............... 10-2007-0055171

(51) Int. Cl.
*H04M 1/00* (2006.01)
*H04B 1/38* (2006.01)

(52) U.S. Cl. ............ 455/566; 455/567; 455/575.1; 455/90.3

(58) Field of Classification Search ......... 455/550.1, 455/566, 567, 575.1, 90.3; 379/433.01, 433.11
See application file for complete search history.

(56) References Cited

U.S. PATENT DOCUMENTS

| 7,181,240 | B2 * | 2/2007 | Kawamoto | 455/556.1 |
| 7,460,893 | B2 * | 12/2008 | Aarras | 455/575.3 |
| 2005/0212983 | A1 * | 9/2005 | Kawamoto | 348/838 |
| 2006/0264243 | A1 * | 11/2006 | Aarras | 455/566 |
| 2008/0132299 | A1 * | 6/2008 | Bostaph | 455/575.1 |

FOREIGN PATENT DOCUMENTS

| CN | 25638709 Y | 7/2003 |
| CN | 2593486 Y | 12/2003 |
| CN | 2631140 Y | 8/2004 |

* cited by examiner

*Primary Examiner*—Tilahun Gesesse
(74) *Attorney, Agent, or Firm*—Birch, Stewart, Kolasch & Birch, LLP

(57) ABSTRACT

A mobile terminal including a first body having a first surface and a second surface and a second body having a first surface and a second surface. In addition, the first body includes a first display located at the first surface and configured to display at least one icon, the at least one icon being selectable by touching the first display where the icon is displayed, a second display located at the second surface and configured to display information, and a receiver located in the first body and configured to transmit sound through the first surface. The second body includes an input device located at the first surface thereof to input information and is rotatably connected to the first body such that the first body can be rotated from a first state to a second state.

23 Claims, 12 Drawing Sheets

MOBILE TERMINAL

CROSS-REFERENCE TO RELATED APPLICATIONS

This application claims priority to Korean Application No. 10-2007-0030464, filed on Mar. 28, 2007, and Korean Application No. 10-2007-0055171, filed on Jun. 5, 2007, which are herein expressly incorporated by reference in their entirety.

BACKGROUND OF THE INVENTION

1. Field of the Invention

The present invention relates generally to a mobile terminal and more particularly, to a mobile terminal having first body rotatably connected to a second body, where the first body includes two displays.

2. Description of Related Art

In general, a mobile terminal is a portable electronic device that is wirelessly connectable to a base station such that a user can perform wireless/radio communications with carrying the mobile terminal. As consumers require more functionality from their mobile terminals, mobile terminals are becoming integrated with other functions of, for example, capturing images with a camera, sending emails, accessing the Internet, and the like, in addition to the traditional wireless communication function.

The related art mobile terminal, however, is typically configured to have an operative configuration appropriate for the implementation of the wireless communication function, without concern for operational configurations appropriate for the other integrated functions.

BRIEF SUMMARY OF THE INVENTION

Therefore, an object of the present invention is to provide a mobile terminal capable of variously implementing operative configurations appropriate for a wireless communication function and other additional functions.

To achieve these and other advantages and in accordance with the purpose of the present invention, as embodied and broadly described herein, there is provided a mobile terminal including a first body having a first surface and a second surface and a second body having a first surface and a second surface. In addition, the first body includes a first display located at the first surface and configured to display at least one icon, the at least one icon being selectable by touching the first display where the icon is displayed, a second display located at the second surface and configured to display information, and a receiver located in the first body and configured to transmit sound through the first surface. The second body includes an input device located at the first surface thereof to input information and is rotatably connected to the first body such that the first body can be rotated from a first state to a second state.

In accordance with another aspect of the present invention, a mobile terminal having a first body having a first surface and a second surface, a second body having a first surface and a second surface, the second body being rotatably connected to the first body along a longitudinal edge of the first body such that the first body can be rotated from a first state to a second state, is also provided. In addition, the first body includes a first display located at the first surface and configured to display at least one icon, the at least one icon being selectable by touching the first display where the icon is displayed, and a second display located at the second surface and configured to display information. The second body also includes an input device located at the first surface thereof to input information.

In accordance with still another aspect of the present invention, a mobile phone is provided that includes a first body having a first surface and a second surface, a second body having a first surface and a second surface, the second body being rotatably connected to the first body such that the first body can be rotated from a first state to a second state, wherein, when the first body and the second body are in the first state, the second surface of the first body substantially covers the second surface of the second body, and when the first body and the second body are in the second state, the second surface of the first body and the second surface of the second body are substantially coplanar. In addition, the first body includes a first display located at the first surface and configured to display at least one icon, the at least one icon being selectable by touching the first display where the icon is displayed, and a receiver located in the first body and configured to transmit sound through the first surface. The second body also includes an input device located at the first surface thereof to input information.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Description will now be given in detail of a mobile terminal in accordance with exemplary embodiments of the present invention, with reference to the accompanying drawings.

Figure 1:
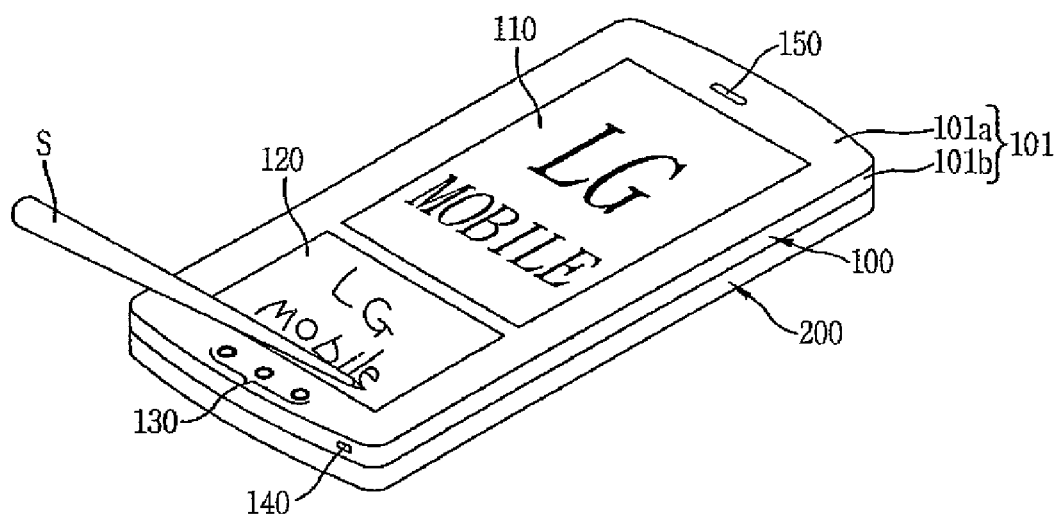
FIG. 1 is a front perspective view showing a mobile terminal in a first state in accordance with a first embodiment of the present invention.

As shown in FIG. 1, a mobile terminal is implemented such that a first body 100 is foldably connected to a second body 200 to be stacked on the second body 200 in a first state or a closed state. An outer surface or first surface 101 of the first body 100 denotes a surface exposed to the exterior without facing the second body 200. In detail, the first surface 101 includes a main surface 101a and a lateral surface 101b extending from the main surface 101a.

A first display 110 and a touch-sensitive input unit 120 are disposed on the main surface 101a of the first surface 101. The first display 110 displays visual information according to a user's operation or a programmatic setting. For example of the former, FIG. 1 shows that letters (characters) inputted by a user using a stylus S is displayed on the first display 110. The touch-sensitive input unit 120 may be a touch screen such that a user can touch an icon displayed for selection. The icon may be a certain key command, menu icon, or character.

One or more key buttons 130 are additionally disposed below the touch-sensitive input unit 120. Unlike the touch-sensitive input unit 120 that inputs various types of characters or images by touching displayed icons, the key buttons 130 are configured such that a particular character or command can be inputted in a pressing manner, which may be slightly more responsive than the touch-sensitive input unit 120. The key buttons 130, such as a scroll key and an enter key, can be used when required to repeatedly enter information. At least one of the key buttons 130 can be an activation button for converting the touch-sensitive input unit 120 from a deactivated state into an activated state. Because the touch-sensitive input unit 120 can be touched to input various types of information, and because the key button(s) 130 can be pressed to repeatedly input information, the touch-sensitive input unit 120 and the key button(s) 130 can be complementarily operated with each other to enhance a user's convenience.

A microphone 140 is located at the lateral surface 101b of the first surface 101, near the key button(s) 130. A receiver 150 is located on the main surface 101a of the first surface 101 near an end portion of the first body opposite the end of the first body 100 on which the microphone 140 is disposed. Accordingly, the user can perform wireless communications using the microphone 140 and the receiver 150 immediately after dialing a phone number using the touch-sensitive input unit 120 or the key button(s) 130. In other words, the user can perform wireless communications without converting the state of the mobile terminal by rotating the first body 100 away from the second body 200. Alternatively, the microphone 140 may be located on the main surface 101a and the receiver 150 may be located on the lateral surface 101b.

In addition, both the microphone 140 and the receiver 150 may be located on the second body 200 as opposed to the first body 100. In this case, the first display 110, which is exposed on the first surface 101, may be prevented from being contaminated due to the contact with the user's face.

Figure 2:
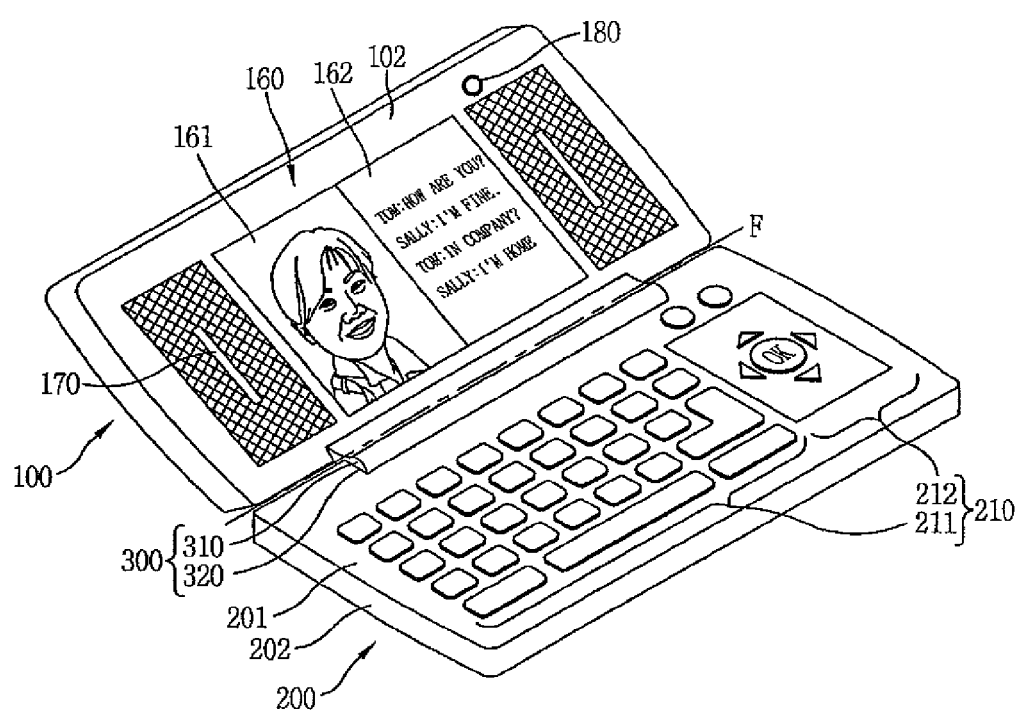
FIG. 2 is a perspective view showing a second state of the mobile terminal of FIG. 1.

The first body 100 of the mobile terminal can be rotatably moved to an open state or second state, as seen in FIG. 2, by rotating the first body 100, which is in a first state, away from the second body 200 about a hinge 300 disposed along a folding line F. The inner surface or second surface 102 of the first body 100 is not exposed to the exterior when it is in the first state (FIG. 1), but it is exposed when the first body 100 is moved away from the first state. A second display 160 is located on the second surface 102. The second display 160 extends in a longitudinal direction of the first body 100, thereby providing a wider screen. In addition, if the second display 160 functions as a touch screen, it can be used not only to display information but also to input information.

A pair of speakers 170 is disposed at opposite ends of the second display 160. Alternatively, only one speaker 170 may be provided, which would allow for a larger display on the second surface. However, in order to provide better sound, a pair of speakers 170 is preferably spaced apart from each other on the second surface 102. An internal camera 180 is located near one of the speakers 170. The internal camera 180 is preferably oriented at an angle facing the user's face while the user views the second display 160.

The second body 200, which is connected to the first body 100 by a hinge 300, has an inner surface or first surface 201 facing the second surface 102 of the first body 100 in a first state. An input device 210, such as a keypad, may be disposed on the first surface 201. The input device 210 may be divided into first and second key regions 211 and 212. In this case, keys on the first key region 211 are preferably arranged in a longitudinal direction of the second body 200 in a QWERTY configuration, so as to efficiently arrange the second display 160 and the second body 200 and to enhance the user's convenience. The second key region 212 is provided with functional keys such as navigation keys, an enter key, a power key, and the like, to complement the key input of the first key region 211.

Figure 3:
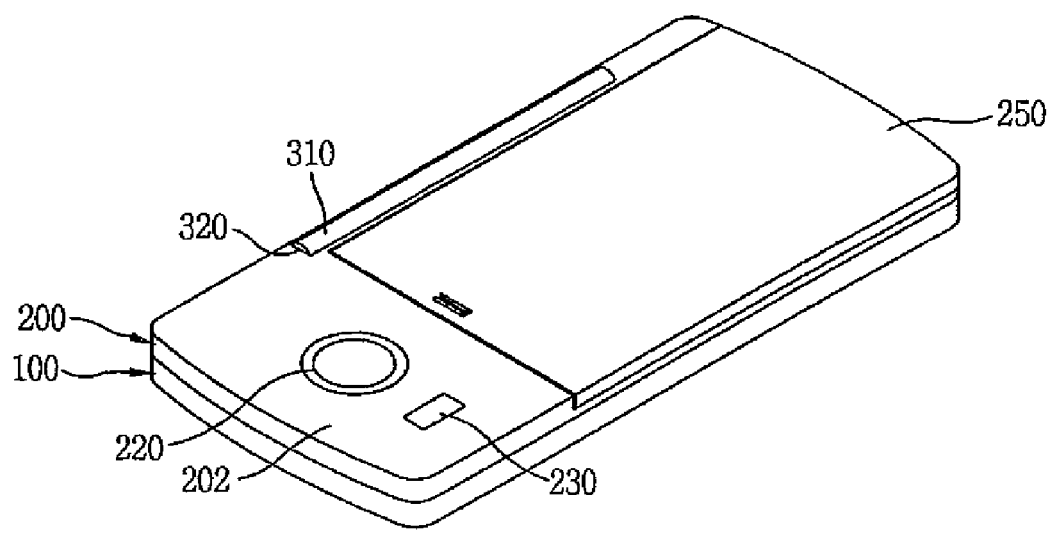
FIG. 3 is a rear perspective view of the mobile terminal of FIG. 1.

As shown in FIG. 3, an external camera 220 may be located at an outer surface or second surface 202 of the second body 200. The external camera 220 captures images in a different direction to that of the internal camera 180. Particularly, if the mobile terminal is opened, the capturing direction of the external camera 220 may be almost opposite to that of the internal camera 180. A flash 230 may be located near the external camera 220. Also, a battery 250 is detachably located at the second surface 202.

Still referring to FIG. 2, the first body 100 and the second body 200 are rotatably connected to each other by the hinge 300. The first body 100 and the second body 200 are rotatable about folding line F such that the first body 100 can be rotated between the first state and the second state. A first hinge portion 310 of the hinge 300 protrudes from the second surface 102 of the first body 100 and extends along a longitudinal direction of the first body 100. A second hinge portion 320, in which the first hinge portion 310 is rotatably inserted, is formed to be recessed in the second body 200.

Accordingly, the hinge 300 is not exposed to the first surface 101 of the first body 100. Instead, the first and second hinge portions 310 and 320 are exposed from one edge of the second surface 202 of the second body 200, as shown in FIG. 3. Because the hinge 300 is not formed at the first surface 101 of the first body 100, the first display 110 arranged on the first surface 101 of the first body 100 can have a larger size without any part interfered with by the hinge 300.

The hinge 300 can allow the second surface 102 of the first body 100 and the first surface 201 of the second body 200 to have a certain angle therebetween, for example, 140°. This angle can be adjusted such that the user's eyes are appropriately positioned on the second display 160 when the second body 200 is placed on a surface, for example, on a desk.

The hinge 300 may further comprise a cam unit including a driving cam, a fixing cam, a spring, and the like, such that the first body 100 can automatically be rotated within a range of a remaining angle by an elastic force after being rotated beyond a certain angle from a closed position. In addition, the hinge 300 may have a type of cam unit by which a user can freely adjust an open angle of the first body 100 in a free-stop manner up to the certain angle mentioned above. The cam unit can be understood by those skilled in the art. Additional details of another cam unit useable with the hinge 300 will be described in more detail with reference to FIGS. 10 and 11 below.

In this first exemplary embodiment, the user can input characters using keys on the first key region 211, while viewing the wide screen of the second display 160. Because the keys on the first key region 211 are arranged in the QWERTY configuration, composition of text or e-mail and an input of text while chatting with another user is easily facilitated.

As such, when the second display 160 is being viewed or otherwise activated, it is preferable that the first display 110 is prevented from displaying information to save power. However, when the first body 100 is rotated to be in the first state, it may be suited to the user's purpose that the second display 160 is deactivated and simultaneously the first display 110 is activated.

The second display 160 may be divided into two or more display regions 161 and 162, for example, during a video telephony. FIG. 2 shows an example in which two display regions 161 and 162 display another party's image and transmitted text, respectively, while performing the video telephony. Here, the user's image captured by the internal camera 180 is transmitted to the other party via a wireless communication. In addition to the video telephony, because the internal camera 180 faces the user, the user can capture his own image using the internal camera 180 (i.e., self-capturing). In this configuration, the second display 160 may function as a view finder.

Figure 4:
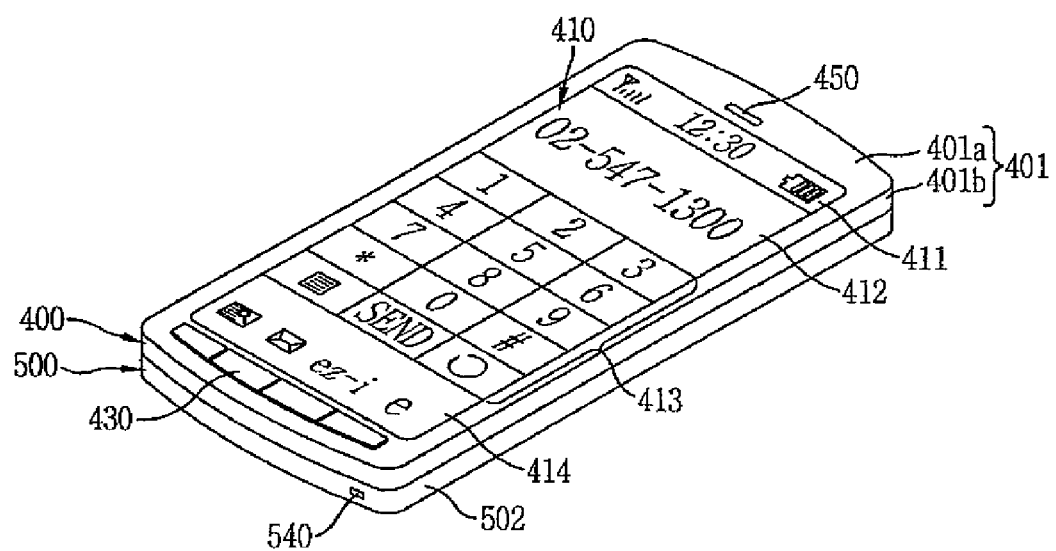
FIG. 4 is a front perspective view showing a mobile terminal in accordance with a second embodiment of the present invention.
Figure 5:
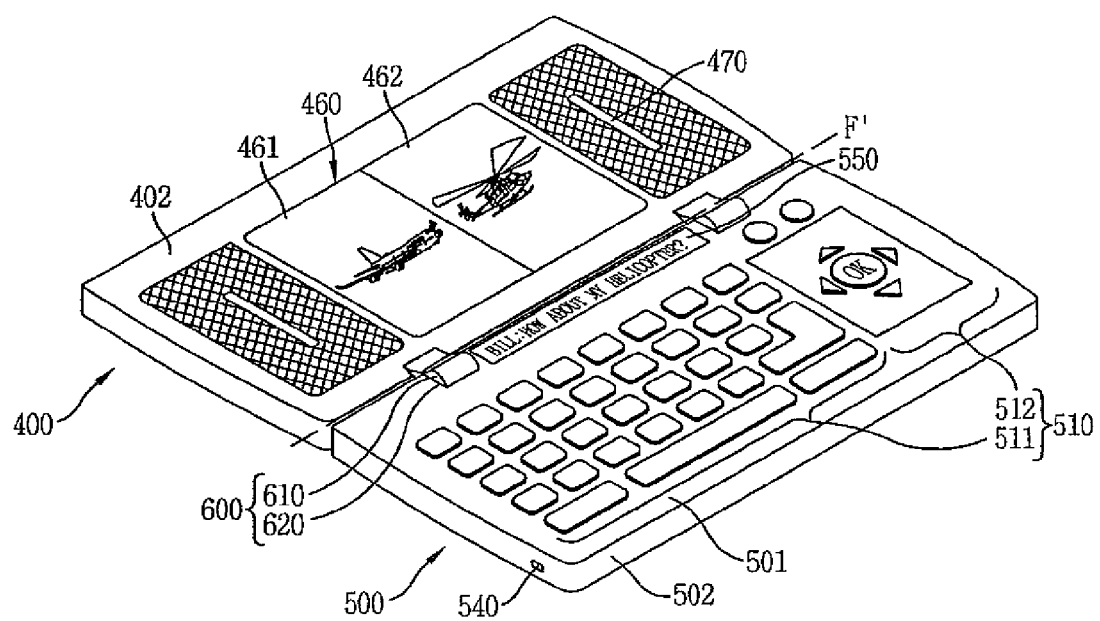
FIG. 5 is a perspective view showing a second state of the mobile terminal of FIG. 4.

A mobile terminal in accordance with a second exemplary embodiment, as shown in FIGS. 4 and 5, is similarly constructed to the first exemplary embodiment, such that a first body 400 is connected to a second body 500 so as to be rotatable between a first state and a second state.

An outer surface or first surface 401 of the first body 400 includes a main surface 401a and a lateral surface 401b. A first display 410 on which information can be inputted or outputted is located at the main surface 401a. In this exemplary embodiment, the first display 410 is implemented as a touch screen and is capable of receiving information when being touched by the user. One or more key buttons 430 are arranged at one side of the first display 410. One of the key buttons 430 may be an activation button for activating the first display 410 to release the first display 410 from a locked/deactivated state by touching the same. A receiver 450 is located at the other side of the first display 410 opposite the key buttons 430. A microphone 540 is located at a second surface 502 of the second body 500, unlike the arrangement in the first embodiment.

The screen on the first display 410 may be divided into various regions. For example, when a user intends to dial a phone number, as shown in FIG. 4, a number display region 412 and a button input region 413 may be required. The number display region 412 displays the number that the user wants to dial by touching a portion of the button input region 413, which displays numbers or key icons. In addition, at an upper side of the number display region 412 is formed an indicating region 411 for informing the user of basic information about the status of the mobile terminal, such as time or remaining battery capacity. At a lower side of the screen of the first display 410 may be formed a menu display region 414 where menu or menu icons are displayed for performing functions of, for example, capturing images, sending text, or accessing the Internet.

Figure 6:
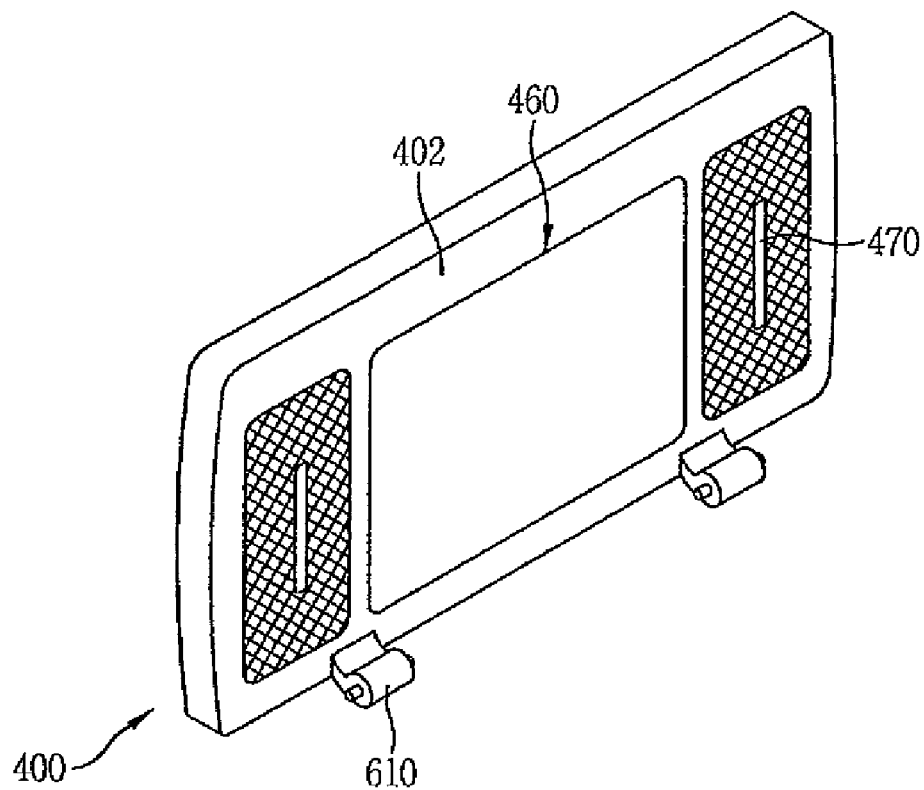
FIG. 6 is a perspective view showing only a first body of the mobile terminal of FIG. 5.

FIG. 5 shows the mobile terminal in the second state, and FIG. 6 is a perspective view only of the first body 400 of FIG. 5. Several components shown in FIGS. 5 and 6 corresponding to those shown in the previous embodiment are provided with similar numerals, and accordingly detailed explanation thereof will not be repeated. Also, the construction of the main surface of the second surface 502 of the second body 500 is similar to that in the previous embodiment, and therefore explanation is omitted.

As shown in FIG. 5, a microphone 540 is located at a lateral surface of the second surface 502 of the second body 500. A third display 550 is disposed at an inner surface or first surface 501 of the second body 500. The third display 550 is located in a space between a pair of first hinge portions 610 of a hinge 600, thereby efficiently utilizing the space.

At opposite ends of the third display 550, the first hinge portions 610 are rotatably connected to second hinge portions 620 located at the second body 500. The hinge 600 allows the rotation of the first body 500 about folding line F' such that the first body 500 can be parallel with the second body 500.

As shown in FIG. 6, the first hinge portion 610 of the hinge 600 protrudes from the inner surface 402 of the first body 400, so that the first hinge portion 610 is not exposed to the first surface 401 of the first body 400, as can be seen in FIG. 4. Accordingly, the first body 400 can have a smooth first surface 401 and the size of the first display 410 is not be restricted by the hinge 600. The former can enhance impression of appearance of the mobile terminal viewed by the user, while the latter can maximize the size of the first display 410 within a range of the first surface 401. This configuration allows the first display 410 to have a greater size than that of the second display 460.

In this exemplary embodiment of the mobile terminal, the user can view still images or moving images displayed on the second display 460 with a wide screen, while holding the second body 500 with his hand. Also, an input device 510, such as a keypad, can be used to assist a user in composing text or e-mail or accessing the Internet, in a more convenient fashion.

Furthermore, as shown in FIG. 5, an image captured using an external camera similar to external camera 220 of the first embodiment, can be displayed on a first display region 461 of the second display 460 and simultaneously be transmitted to another party in communication with the user. Image information received from the other party may be displayed on a second display region 462. The user can communicate with the other party, white simultaneously comparing the images displayed on each display region 461 and 462. Here, additional contents, such as text from the other party, may be displayed on the third display 550.

If the third display 550 has a similar length (i.e., a length extending along the folding line F') to that of the second display 460, the second and third displays 460 and 550 may be operated as one display. For example in case of displaying a web-page, the web-page may be displayed on both the second display 460 and the third display 550.

Figure 7:
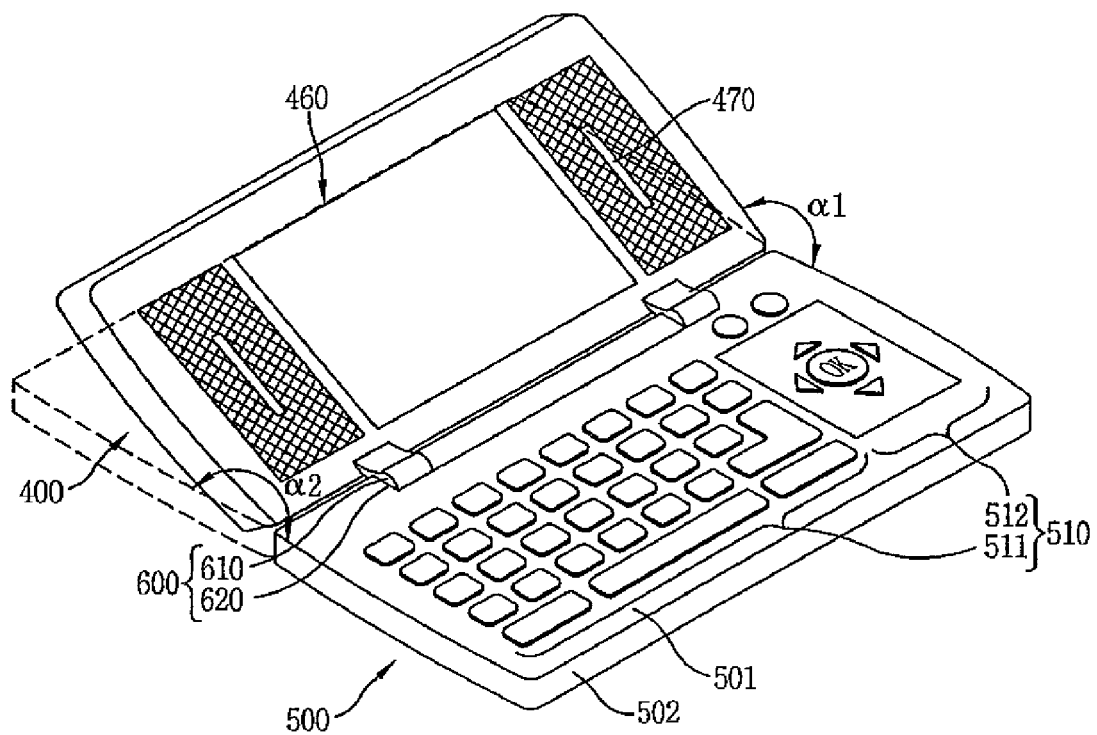
FIG. 7 is a perspective view showing a rotation operation of the mobile terminal of FIG. 5.

The first body 400 of the mobile terminal is rotatably openable between a first state, as shown in FIG. 4, to a second state, as shown in FIG. 5, and is also positionable between the first state and the second state, as shown in FIG. 7. In particular, the first body 400 may be rotated away from the second body 500 by two steps (angles).

First, the first body 400 can be freely rotated to a certain rotation angle up to a first rotation angle $\alpha 1$ (e.g., up to approximately 140°). Upon rotating the first body 400 over the first rotation angle α1, the first body 400 can be rotated up to a second rotation angle α2 without stopping. Here, the second rotation angle α2 may be 180° and the mobile terminal is considered to be in the second state. Such a multi-stepped hinge, for example, has been disclosed in U.S.A. application Ser. No. 11/469,063 filed on Aug. 31, 2006, which is incorporated by reference. Therefore, any additional explanation thereof will not be repeated.

According to the construction of the hinge 600, the user can arrange the first body 400 with respect to the second body 500 as shown in FIG. 7. If the first body 400 is opened to the first rotation angle α1 as shown in FIG. 7, the second display 160 is at a suitable angle for viewing while the mobile terminal is on a desk or the like. If the first body 400 is opened to the second rotation angle α2 as shown in FIG. 7, it is convenient for the user to view the second display 460 while holding the mobile terminal with his hand. In addition, the first body 400 is stoppable at any angle up to the first rotation angle α1. Accordingly, the user can use this characteristic to adjust the rotation angle such that the user's eyes can be appropriately positioned on the second display 160.

Figure 8:
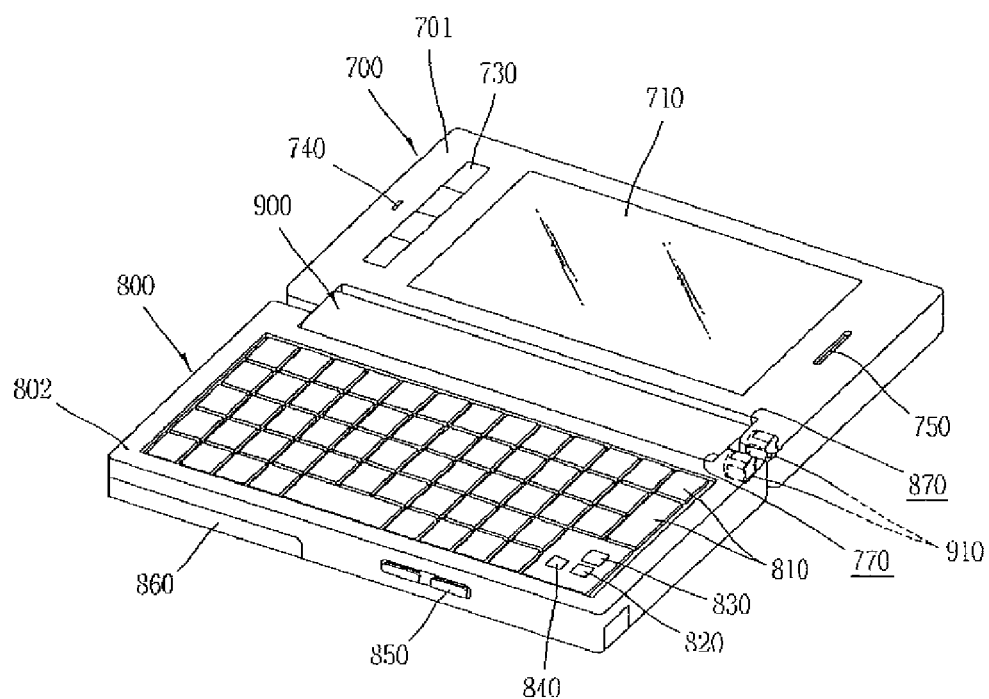
FIG. 8 is a perspective view showing a second state of a mobile terminal in accordance with a third embodiment of the present invention.
Figure 9A:
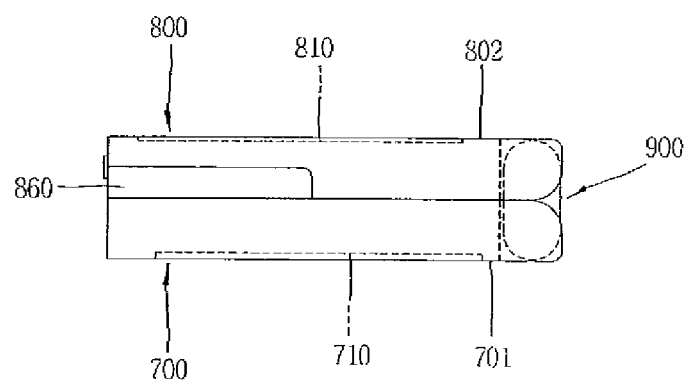
FIGS. 9A to 9C are sectional views showing a process of converting the state of the terminal of FIG. 8 from a first state into an opened state.
Figure 9B:
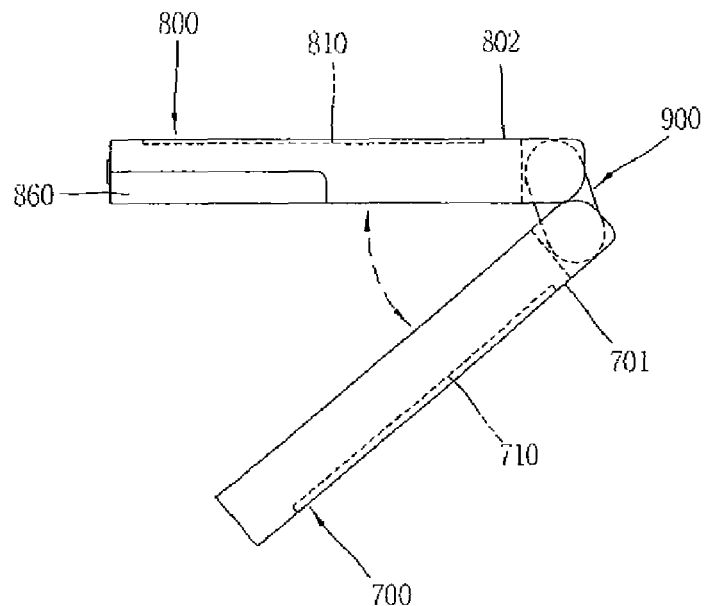
Figure 9C:
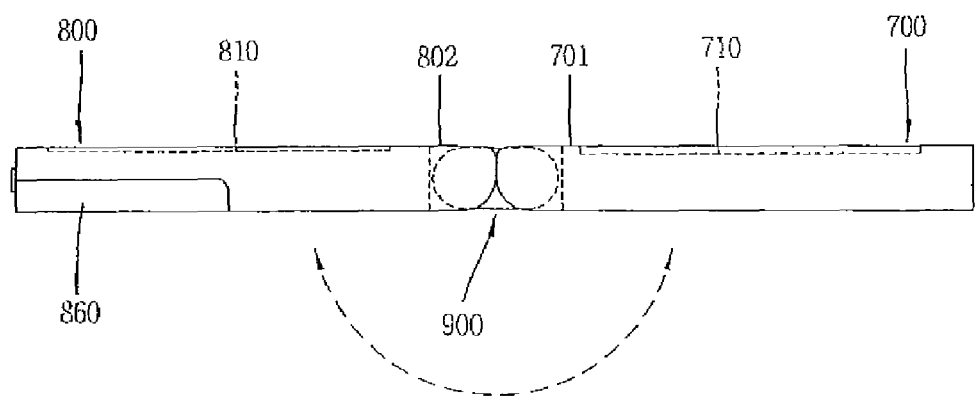

FIG. 8 is a perspective view showing a mobile terminal in accordance with a third embodiment of the present invention in the second state, and FIGS. 9A to 9C are sectional views showing a process of converting the state of the terminal of FIG. 8 from a first state into the second state. This exemplary embodiment includes components similar to those described above, and where possible similar numerals to those in the previous embodiment have been used, detailed explanation of similarly numbered components will not be repeated. This exemplary embodiment is different from previous embodiments in that the rotational motion of the first body 700 is opposite that of the previous embodiments such that the input device 810 located at the second body 800 is always exposed.

As shown in FIG. 8, a display 710, key buttons 730, a microphone 740, and a receiver 750 are located at an outer surface or first surface 701 of the first body 700. Because the microphone 740 and the receiver 750 are located at the first surface 701, communication can be done using the mobile terminal even in its first state (see FIG. 9A).

The second body 800 is rotatably coupled to the first body 700 by a hinge 900. An input device 810, an outer camera 820, a flash 830, a mirror 840, and side keys 850 are provided at an outer surface or first surface 802 of the second body 800. A battery 860 is detachably coupled to an inner surface or second surface extending from the outer surface 802 (i.e., a surface corresponding to 201 of FIG. 2). The input device 810 in this embodiment has keys arranged in the QWERTY configuration similarly to the input devices 210 and 510 of the previous embodiments. Alternatively, the input device 810 may be arranged at the first surface 802 differently from the previous embodiments.

The input device 810, as shown in FIGS. 9A to 9C, is outwardly exposed regardless of the opened or closed state of the mobile terminal. In order to avoid the input device 810 from being operated regardless of the user's intention, preferably, the input device 810 is lockable in the first state.

Upon rotating the first body 700 by 180° from its first state, the display 710 and the input device 810 may be positioned approximately on the same plane as shown in FIG. 8 (and FIG. 9C). In this configuration, the user can input long text on the mobile terminal by operating the input device 810 and the inputted text can be displayed on the display 710. In this arrangement, the rear surfaces of the first and second bodies 700 and 800 are substantially coplanar. Unlike in the illustrated drawings, the first body 700 may be configured to be rotated over 180° such that the user can input text even in the state that the display 710 and the input device 810 are not parallel to each other.

Figure 10:
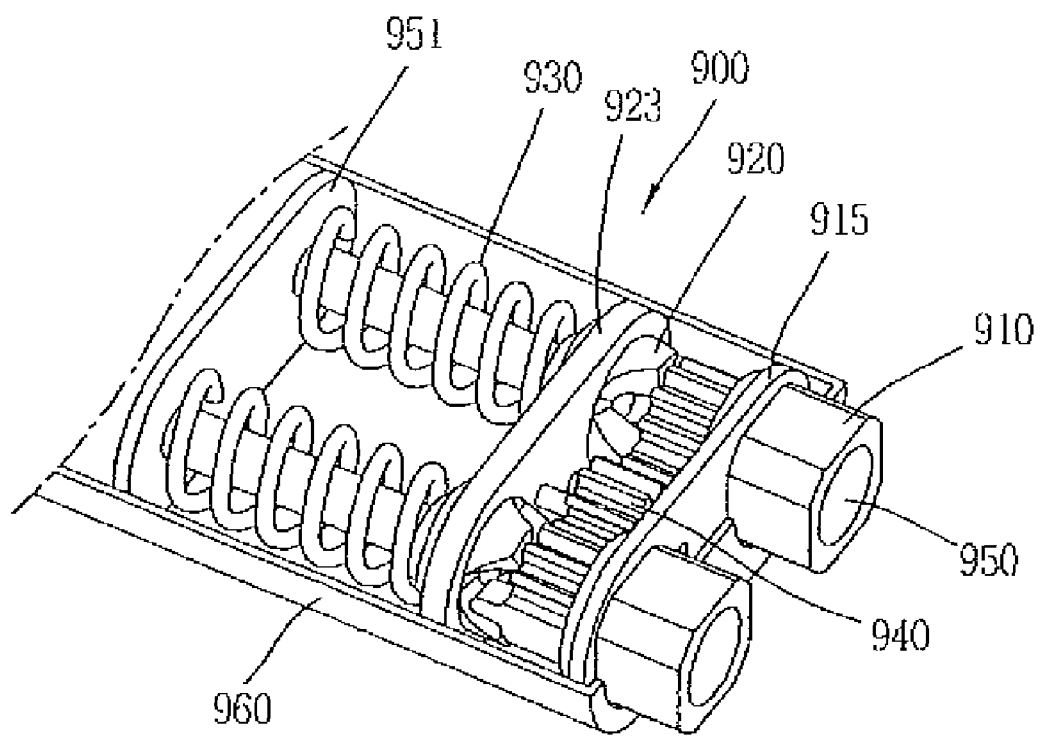
FIG. 10 is an assembled perspective view showing one end portion of a hinge of FIG. 8 with a portion of a hinge housing removed.
Figure 11:
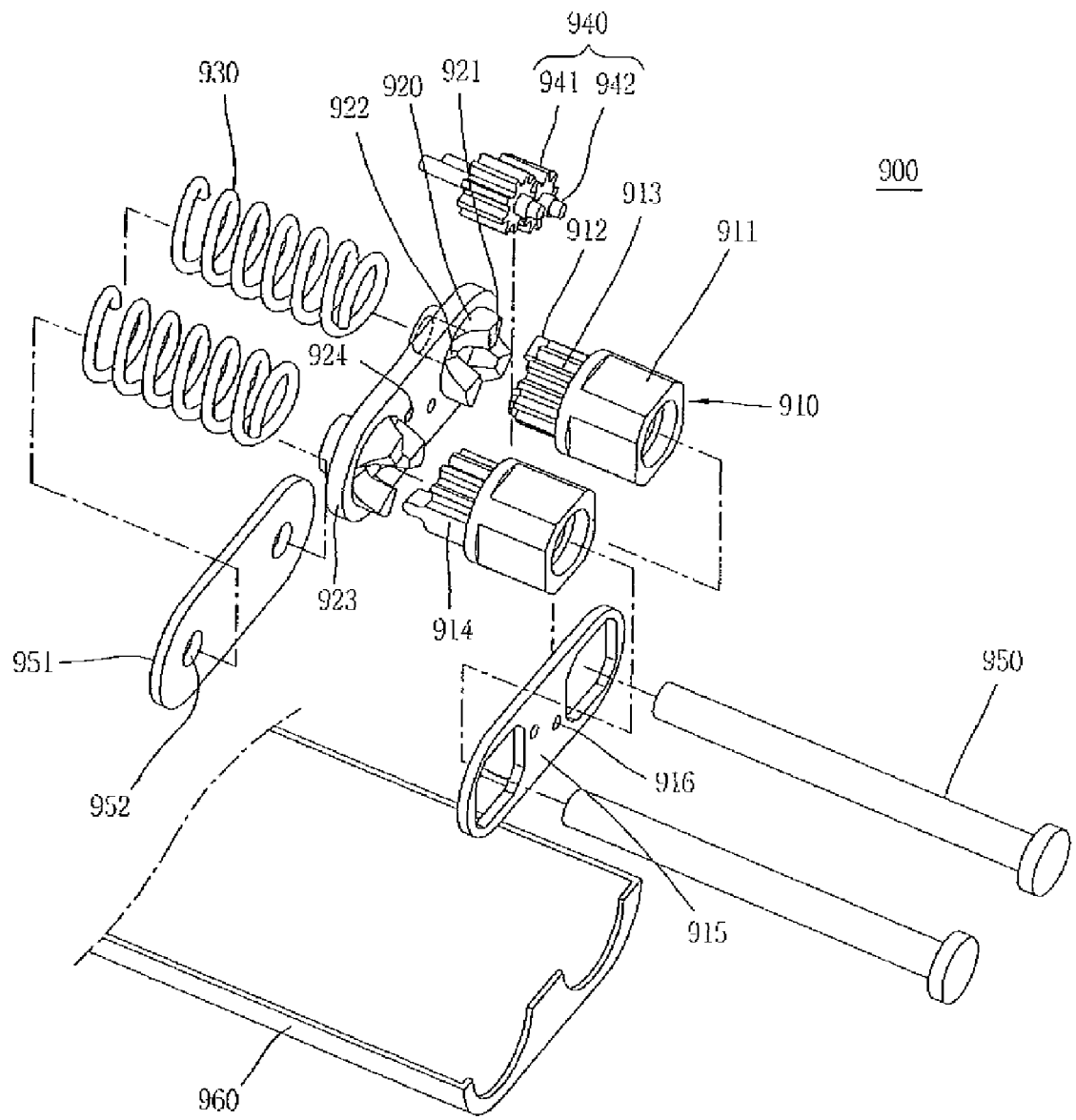
FIG. 11 is an exploded perspective view of FIG. 10.

As shown in FIGS. 10 and 11, the hinge 900 includes fixed cams 910, movable cams 920, and a hinge housing 960. A pair of fixed cams 910 may be provided, each fixed cam is coupled to a respective portions of the first and second hinge portions 770 and 870 of the first and second bodies 700 and. If the bodies 911 of the fixed cams 910 have an angled shape, the fixed cams 910 can be integrally rotated together with the first and second bodies 700 and 800. At least one protrusion 912 is protrudingly formed at an end portion of each body 911 disposed inside the hinge housing 960. The fixed cams 910 can be coupled to each other by being inserted into holes formed at a connection member 915.

Each of the movable cams 920 may include a convex portion 921 and a concave portion 922 so as to be interworked with the corresponding protrusion 912 of the fixed cams 910. The movable cams 920 may be elastically pressed toward the fixed cams 910 by elastic members 930. The movable cams 920 may also be coupled to each other by being inserted into holes formed at a connection member 923.

The fixed cams 910, the movable cams 920, and the elastic members 930 can all be coupled together by hinge guides 950 and a connection member 951 so as to provide a modularized unit. The hinge guides 950 penetrate through hollow channels formed in the connection member 915, the fixed cams 910, the movable cams 920, and the elastic members 930 in their length directions. The hinge guides 950 are coupled to the connection member 951 through guide grooves 952.

Each of the pair of fixed cams 910 and the pair of movable cams 920 may be operated independently from each other or cooperate with each other. For implementing the latter case, the embodiment may further include a cooperating unit 940 for allowing the fixed cams 910 to be cooperated with each other.

The cooperating unit 940 may include a pair of gears 941 disposed between the fixed cams 910. Each gear 941 has a shaft 942 that is inserted into holes 916 and 924 formed at the connection members 915 and 923, respectively. To provide cooperation between the gears 941 and the fixed cams 910, gear portions 913 in the form of gear teeth may be formed at an outer circumference of each fixed cam 910 and engage gears 941.

A region may be provided at the outer circumference of the fixed cam 910 where gear teeth are not formed. The gears 941 cannot cooperate with the gear portions 913 in this region, thereby limiting the cooperative rotation of the fixed cams 910. This region may be referred to as a rotation-limited region 914.

In this configuration, when the first body 700 is rotated as shown in FIGS. 9A to 9C, the fixed cam 910 coupled to the first body 700 is rotated with respect to the movable cam 920. Upon the rotation, the protrusion 912 of the fixed cam 910 is interworked with the convex portion 921 or the concave portion 922 of the movable cam 920. During this interworking, the movable cam 920 is repeatedly moved along the direction, in which the elastic member 930 extends, while being supported by the elastic member 930.

By the interworking, particularly, the interference between the protrusion 912 and the convex portion 921/concave portion 922, the rotation of the movable cams 920 with respect to the fixed cams 910 or vice versa is allowed to be semi-automatically performed within a certain range (i.e., within the interval in which the protrusion 912 is moved from the convex portion 921 to the concave portion 922). Also, the interworking makes the first body 700 stop at a certain angle with respect to the second body 800 (i.e., an angle at which the protrusion 912 is engaged with the concave portion 922) during its rotation.

Upon rotating the first body 700 (and one fixed cam 910 coupled thereto), the other fixed cam 910 interworked by the cooperating unit 940 is also rotated. When one of the fixed cams 910 is rotated in one direction, either clockwise (CW) or counterclockwise (CCW), the other fixed cam 910 is rotated by the pair of gears 941 in an opposite direction, either CCW or CW.

As a result, not only is the first body 700 rotated with respect to the one fixed cam 910, but the other fixed cam 910 is also rotated together with the second body 800. Accordingly, the first and second bodies 700 and 800 can be rotated at the same time, which results in allowing the user to easily operate the mobile terminal. Also, the relative rotation between the first and second bodies 700 and 800 can be limited within the range of angle set by the rotation-limited region 914.

In addition, like in the previous embodiments, in this embodiment the hinge 900 is arranged so as not to be exposed to the outside in the second state. For this, the first and second hinge portions 770 and 870 are recessed at corresponding surfaces of the first and second bodies 700 and 800.

Figure 12:
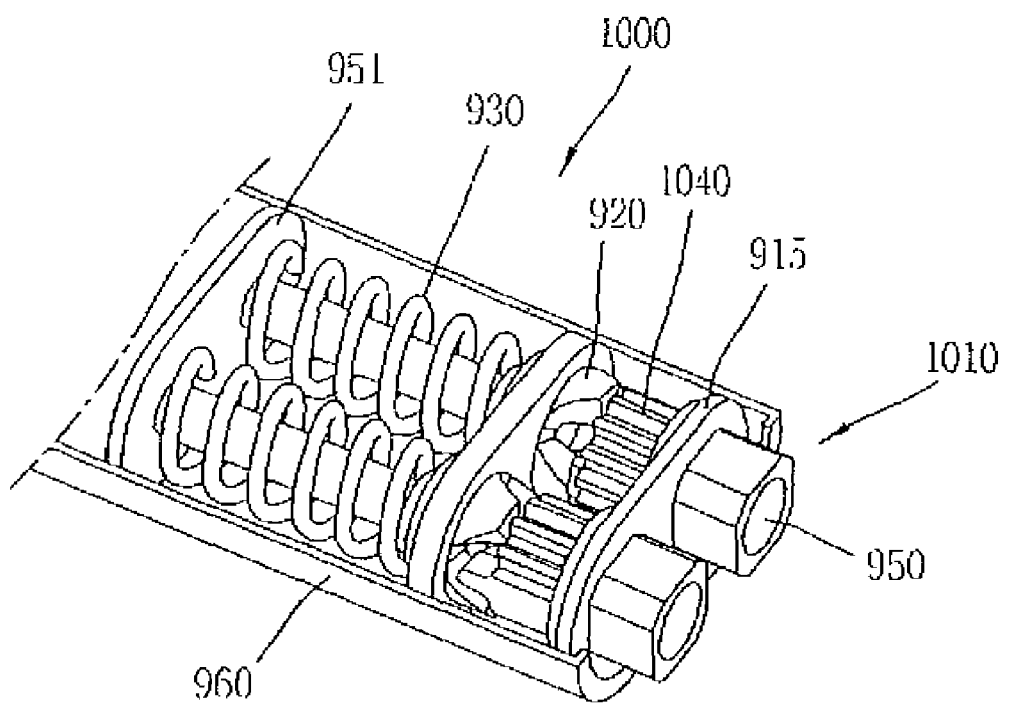
FIG. 12 is a partial perspective view showing one modification of the hinge shown in FIG. 10.

As shown in FIG. 12, a different hinge 1000 may be used that is similar to that of the previous embodiment. However, the hinge 1000 may not include the gears (941 in FIG. 11). Instead of the gears 941, cooperating units 1040 in a shape of gear teeth may be formed at outer circumference of fixed cams 1010. The gear teeth are sized to directly engage one another. In addition, an end portion opposite to an end portion of the fixed cam 1010 having the cooperating unit 1040 is formed to have an outer diameter smaller than that of the opposite end portion, such that the cooperating units 1040 can be engaged with one another so as to be operated without any difficulty. In this modification, when one of the fixed cams 1010 is rotated in one direction (CW or CCW), the other fixed cam 1010 is rotated in an opposite direction (CCW or CW). The operation of the hinge portion 1000 is similar to that described above.

As described above, a mobile terminal according to embodiment of the present invention is provided with a touch-sensitive input unit at an outer surface thereof such that various information can be inputted even in a closed state. Also, a microphone and a receiver are disposed at the outer surface of the mobile terminal, such that a phone number can be inputted using the touch-sensitive input unit and communication can be performed without turning the mobile terminal to an open state.

When employing a touch screen at an outer surface, a display region can be maximized. Also, Because the hinge is not exposed to the outer surface of a first body, the touch screen can have a larger size without any interruption of the hinge. Upon opening the mobile terminal, a more appropriate environment can be provided for the functions of composing text or email, accessing Internet, etc. In addition, a video telephony can be supported by using internal and external cameras.

The mobile terminal according to the present invention has been explained with reference to the attached drawings. However, as the present invention may be embodied in several forms without departing from the spirit or essential characteristics thereof, it should also be understood that the above-described embodiments are not limited by any of the details of the foregoing description and drawings.

What is claimed:

1. A mobile terminal comprising:
   a first body having a first surface and a second surface, the first body including:
      a first display located at the first surface and configured to display at least one icon, the at least one icon being selectable by touching the first display where the icon is displayed;
      a second display located at the second surface and configured to display information;
      at least one key button disposed at the first surface of the first body; and
      a receiver located in the first body and configured to transmit sound through the first surface; and
   a second body having a first surface and a second surface, the second body being rotatably connected to the first body such that the first body can be rotated from a first state to a second state, and the second body having an input device located at the first surface thereof to input information,
   wherein the first and the second surfaces of the first body are facing in opposite directions, and the second surface of the first body covers the second surface of the second body when the first body and the second body are in the first state, and
   wherein the first display is a touch screen, and the at least one key button is an activation button configured to input a signal to activate the touch screen.

2. The terminal of claim 1, wherein the second surface of the first body is adjacent the first surface of the second body in the first state.

3. The terminal of claim 1, wherein the first display extends along a longitudinal direction of the first body.

4. The terminal of claim 1, further comprising:
   a microphone located at one of the first surface of the first body and the second surface of the second body; and
   a receiver located at one of the first surface of the first body and the second surface of the second body.

5. The terminal of claim 4, wherein the microphone and the receiver are located at the first surface of the first body, each being located near opposite ends of the first display.

6. The terminal of claim 1, wherein the second display is a touch screen.

7. The terminal of claim 1, further comprising:
   at least one speaker located at the second surface of the first body.

8. The terminal of claim 7, wherein the at least one speaker includes a pair of speakers located near opposite ends of the second display.

9. The terminal of claim 1, wherein the input device located at the first surface of the second body includes a first key region where keys are arranged in a QWERTY configuration.

10. The terminal of claim 9, wherein the input device includes a second key region having at least one functional key.

11. The terminal of claim 1, wherein the second display is activated in the second state, and the first display is activated in the first state.

12. The terminal of claim 1, further comprising at least one camera, the at least one camera being disposed at one of the second surface of the first body, the first surface of the second body, and the second surface of the second body, and an image captured by the at least one camera being displayable on at least one of the first display and the second display.

13. The terminal of claim 12, wherein the second display includes a plurality of display regions configured to display information, and the image captured by the at least one camera is displayable at one of the display regions.

14. The terminal of claim 1, further comprising a hinge that rotatably connects the first body to the second body, the hinge being located at the second surface of the first body.

15. The terminal of claim 14, wherein the hinge includes at least two spaced apart hinge portions and the second body includes a display located between the spaced apart hinge portions.

16. The terminal of claim 14, wherein the hinge is configured to hold the first body at a plurality of rotation angles with respect to the second body.

17. The terminal of claim 16, wherein the plurality of rotation angles includes two rotation angles,
wherein the first body is freely rotatable from the first state through a first rotation angle, and freely rotatable from the first rotation angle to a second rotation angle.

18. The terminal of claim 17, wherein the first body is substantially parallel with the second body when the first body is rotated to the second rotation angle.

19. The terminal of claim 1, wherein the first surface of the first body includes a main surface and a lateral surface surrounding the main surface.

20. The terminal of claim 1, further comprising a hinge for rotatably connecting the first and second bodies to each other, the hinge including:
a hinge housing located in one of the first and second bodies;
a pair of fixed cams, each fixed cam having one end disposed inside the hinge housing and the other end coupled to one of the first and second bodies, each being rotatable with respect to the hinge housing by the movement of the first body between the first position and the second position; and
a pair of movable cams supported inside the hinge housing and configured to cooperate with the pair of fixed cams.

21. A mobile terminal comprising:
a first body having a first surface and a second surface, the first body including:
a first display located at the first surface and configured to display at least one icon, the at least one icon being selectable by touching the first display where the icon is displayed;
a second display located at the second surface and configured to display information; and
at least one key button disposed at the first surface of the first body; and
a second body having a first surface and a second surface, the second body being rotatably connected to the first body along a longitudinal edge of the first body such that the first body can be rotated from a first state to a second state, and the second body having an input device located at the first surface thereof to input information,
wherein the first and the second surfaces of the first body are facing in opposite directions, and the second surface of the first body covers the second surface of the second body when the first body and the second body are in the first state, and
wherein the first display is a touch screen, and the at least one key button is an activation button configured to input a signal to activate the touch screen.

22. A mobile terminal comprising:
a first body having a first surface and a second surface, the first body including:
a first display located at the first surface and configured to display at least one icon, the at least one icon being selectable by touching the first display where the icon is displayed;
at least one key button disposed at the first surface of the first body; and
a receiver located in the first body and configured to transmit sound through the first surface; and
a second body having a first surface and a second surface, the second body being rotatably connected to the first body such that the first body can be rotated from a first state to a second state, and the second body having an input device located at the first surface thereof to input information,
wherein, when the first body and the second body are in the first state, the second surface of the first body substantially covers the second surface of the second body, and when the first body and the second body are in the second state, the second surface of the first body and the second surface of the second body are substantially coplanar,
wherein the first and the second surfaces of the first body are facing in opposite directions, and
wherein the first display is a touch screen, and the at least one key button is an activation button configured to input a signal to activate the touch screen.

23. A mobile terminal comprising:
a first body having a first surface and a second surface, the first body including:
a first display located at the first surface and configured to display at least one icon, the at least one icon being selectable by touching the first display where the icon is displayed;
a second display located at the second surface and configured to display information; and
a receiver located in the first body and configured to transmit sound through the first surface; and
a second body having a first surface and a second surface, the second body being rotatably connected to the first body such that the first body can be rotated from a first state to a second state, and the second body having an input device located at the first surface thereof to input information; and
a hinge for rotatably connecting the first and second bodies to each other, the hinge including:
a hinge housing located in one of the first and second bodies;
a pair of fixed cams, each fixed cam having one end disposed inside the hinge housing and the other end coupled to one of the first and second bodies, each being rotatable with respect to the hinge housing by the movement of the first body between the first position and the second position; and
a pair of movable cams supported inside the hinge housing and configured to cooperate with the pair of fixed cams.

* * * * *